(12) United States Patent
Thøgersen

(10) Patent No.: US 7,156,604 B2
(45) Date of Patent: Jan. 2, 2007

(54) APPARATUS FOR LOADING AND UNLOADING AIRCRAFT

(75) Inventor: Lars Thøgersen, Copenhagen (DK)

(73) Assignee: RASN A/S c/o SAS, Kastrup ( * ) Notice: Subject to any disclaimer, the term of this patent is extended or adjusted under 35 U.S.C. 154(b) by 0 days.

(21) Appl. No.: 10/720,471

(22) Filed: Nov. 25, 2003

(65) Prior Publication Data

US 2004/0105740 A1 Jun. 3, 2004

Related U.S. Application Data

(63) Continuation of application No. 10/279,965, filed on Oct. 25, 2002, now abandoned, which is a continuation of application No. 10/169,361, filed on Oct. 23, 2002, now Pat. No. 7,033,125, which is a continuation of application No. PCT/DK01/00012, filed on Jan. 10, 2001.

(30) Foreign Application Priority Data

Jan. 11, 2000 (DK) ............................... 2000 00031

(51) Int. Cl.
*B65G 57/112* (2006.01)

(52) U.S. Cl. ...................... 414/345; 198/812

(58) Field of Classification Search ................ 414/332, 414/345, 346; 198/584, 586, 588, 813, 812, 198/861.1
See application file for complete search history.

(56) References Cited

U.S. PATENT DOCUMENTS

| | | | |
|---|---|---|---|
| 2,242,206 A | 5/1941 | Bisset | 198/86 |
| 2,494,302 A | 1/1950 | Mason | 193/35 F |
| 3,268,099 A | 8/1966 | Ajero et al. | |
| 3,356,236 A | 12/1967 | Shaw et al. | 414/398 |
| 3,524,558 A | 8/1970 | Mastracci et al. | 414/345 |
| 3,885,682 A | 5/1975 | McWilliams | 414/789.8 |
| 4,164,338 A | 8/1979 | Myron | 410/92 |
| 4,266,650 A | 5/1981 | Patel et al. | 193/35 TE |
| 4,618,057 A | 10/1986 | Howser | 198/861.2 |
| 5,040,655 A | 8/1991 | Lacagnina | 193/35 SS |
| 5,224,584 A | 7/1993 | Best et al. | 198/782 |

(Continued)

FOREIGN PATENT DOCUMENTS

DE 37 03969 A1 4/1988

(Continued)

OTHER PUBLICATIONS

Kornylak Corp., Universal Power Conveyer—fast portable transfer of bulk or unitized loads, Undated Brochure of Kornylak Corp., Hamilton, Ohio.

(Continued)

*Primary Examiner*—Kathy Matecki
*Assistant Examiner*—Charles A. Fox
(74) *Attorney, Agent, or Firm*—Finnegan, Henderson, Farabow, Garrett & Dunner, LLP

(57) ABSTRACT

An apparatus for loading and unloading aircrafts comprises a tiltable first conveyor part (7) adjustable in height and provided with a conveyor path (11) advancing and removing luggage (59), such as suitcases, parcels and the like cargo items, to and from the apparatus. The apparatus comprises further a second conveyor part (8) extendable from the first conveyor part and being adapted to be moved through an opening in the aircraft and into the cargo compartment of said aircraft. This second conveyor part (8) comprises a conveyor path advancing or removing the luggage to or from the storing site inside the cargo compartment. The second conveyor part (8) comprises a plurality of pivotally interconnected conveyor units (30, 31) with their respective activatable conveyor paths and their respective sets of wheels (44).

24 Claims, 13 Drawing Sheets

U.S. PATENT DOCUMENTS 5,584,376 A    12/1996   Voldby

FOREIGN PATENT DOCUMENTS

| DK | 170863 B1 | 9/1994 |
| WO | WO 89/02852 | 4/1989 |
| WO | WO 98/54073 | 12/1998 |

OTHER PUBLICATIONS

Kornylak Corp., Power-Loaded—fast dependable on-off loading of baggage, airfreight, mail, Undated Brochure of Kornylak Corp., Hamilton, Ohio.

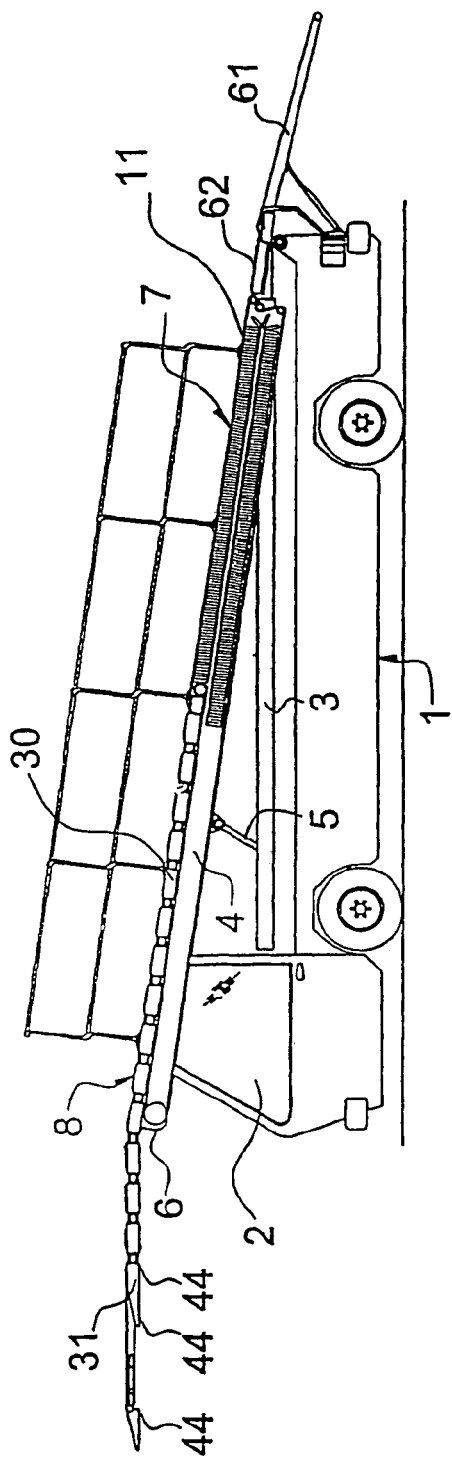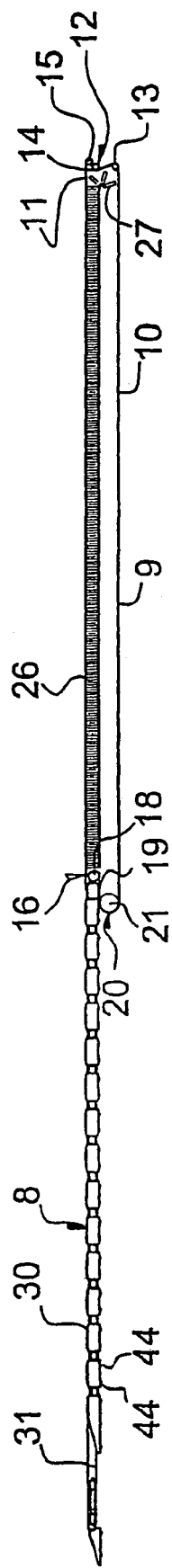

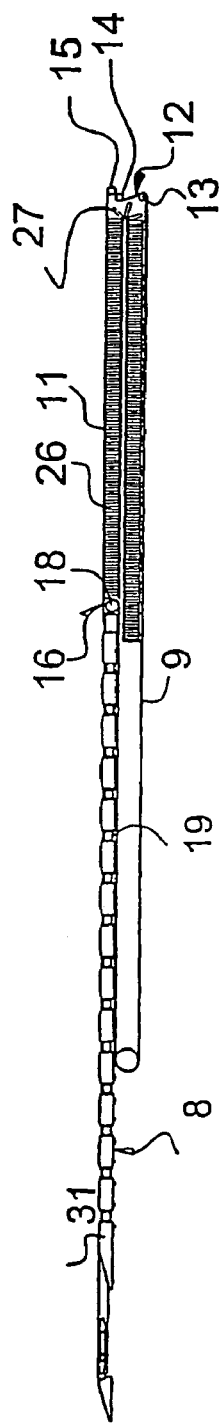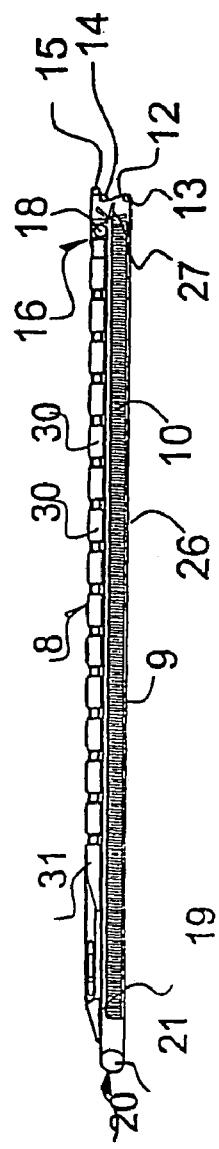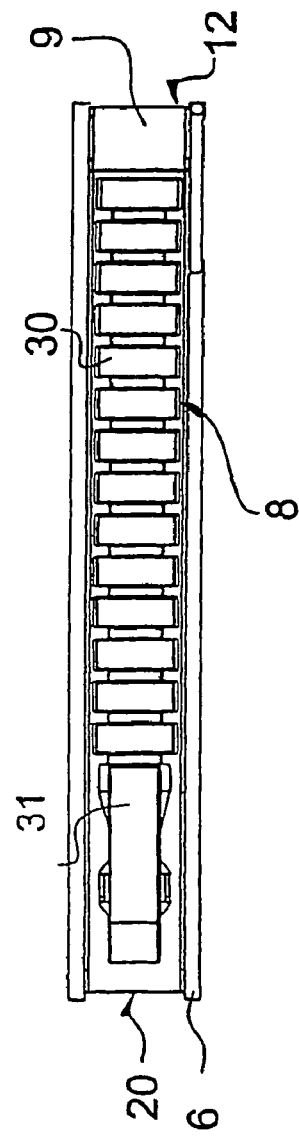

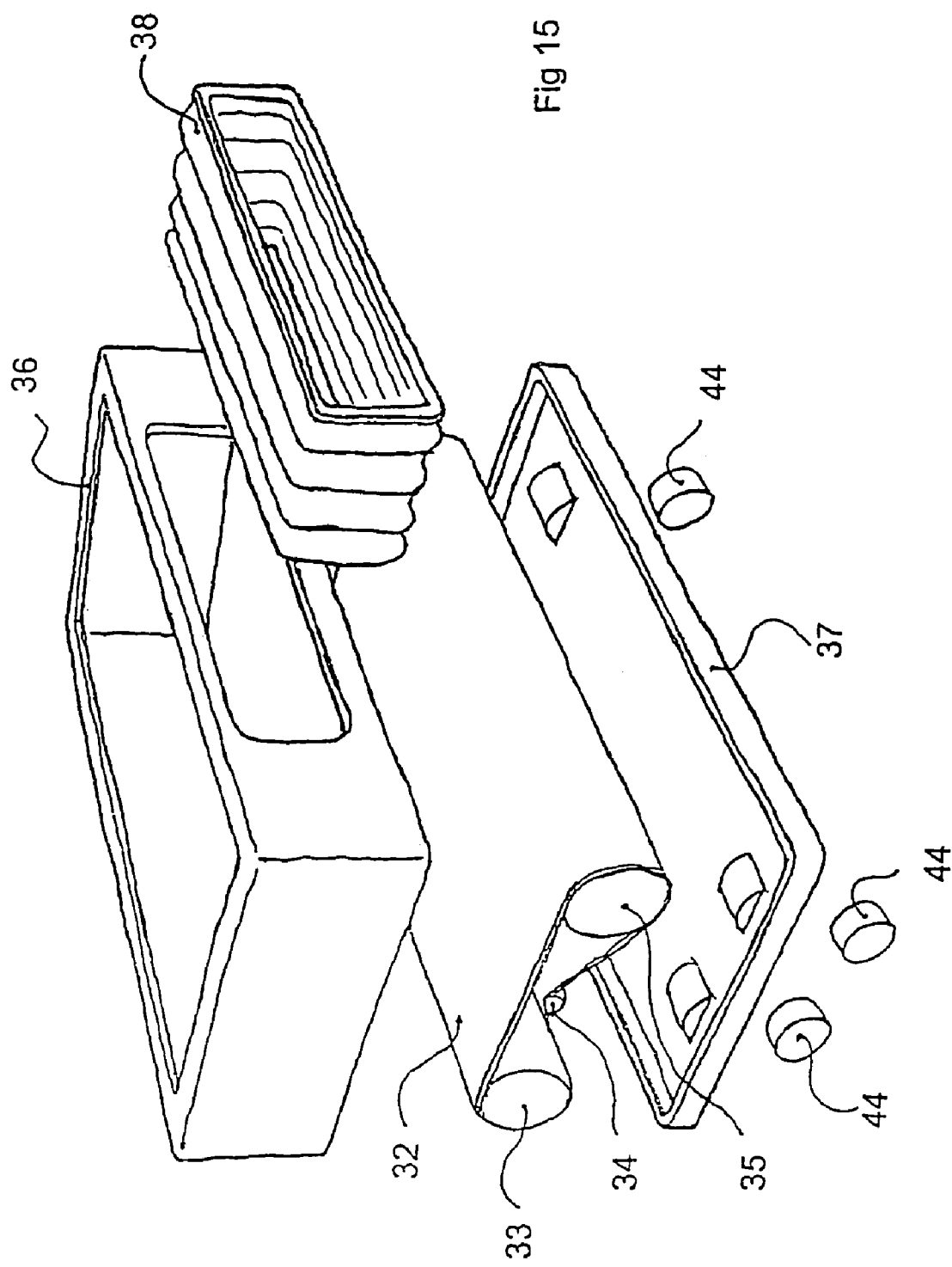

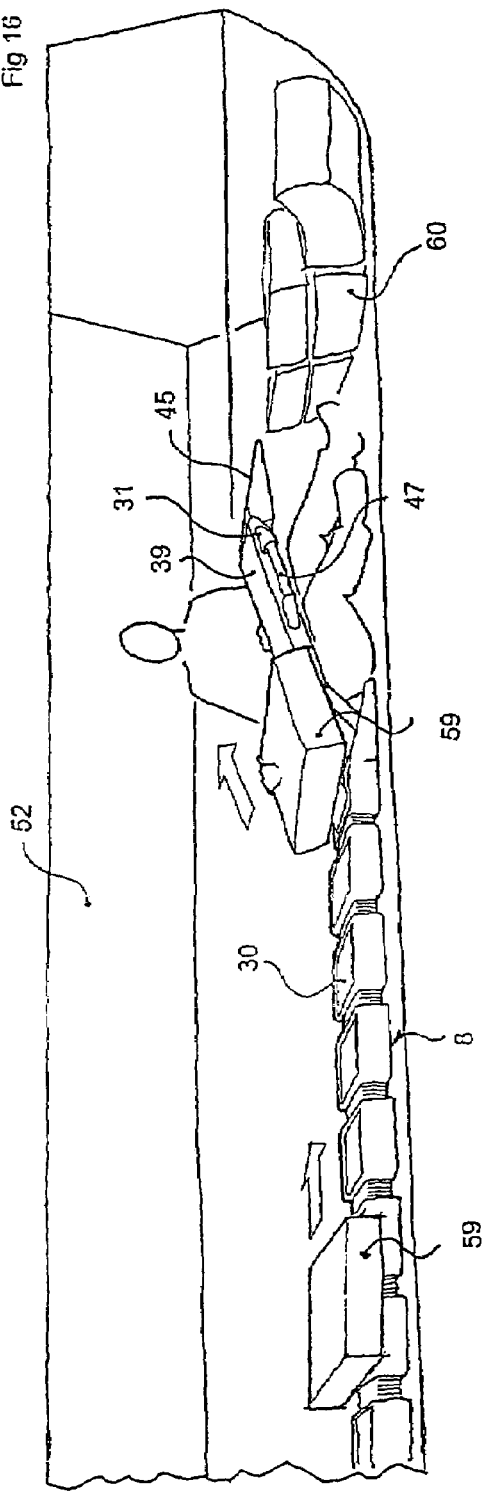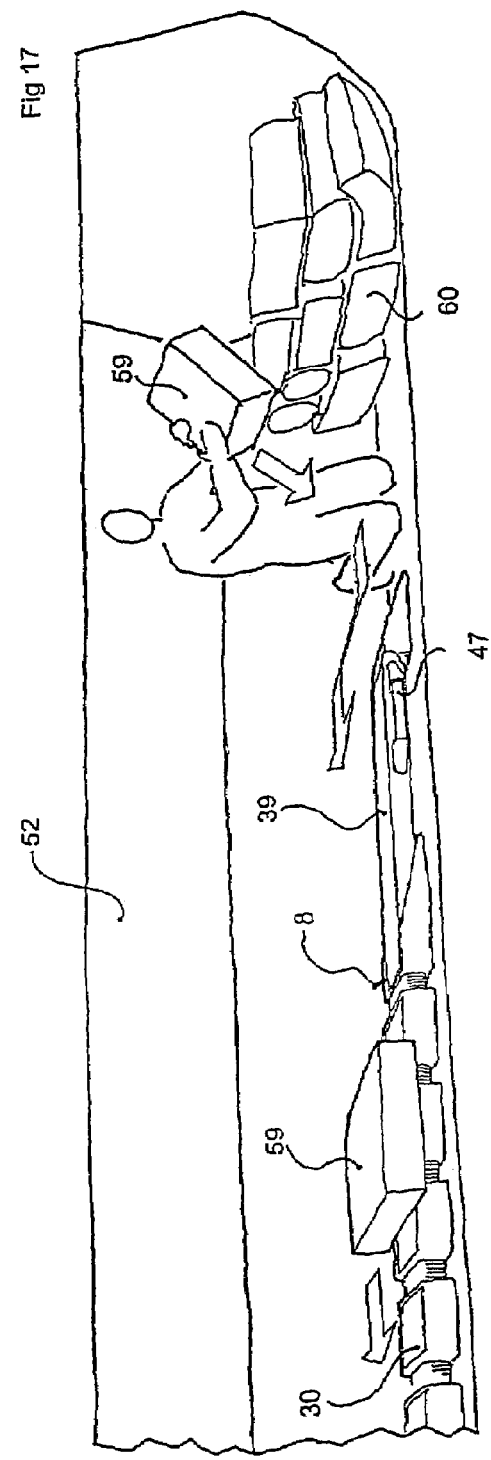

APPARATUS FOR LOADING AND UNLOADING AIRCRAFT

This is a continuation of application Ser. No. 10/279,965, filed Oct. 25, 2002, now abandoned which is a continuation of application Ser. No. 10/169,361 filed Oct. 23, 2002, now U.S. Pat No. 7,033,125 which is a 371 of PCT/DK01/00012, filed Jan. 10, 2001, which is based on Application No. PA 2000 00031, filed on Jan. 11, 2000, in Denmark, all of which are incorporated herein by reference.

TECHNICAL FIELD

The invention relates to an apparatus for loading and unloading aircrafts, where said apparatus comprises a tiltable first conveyor part adjustable in height and comprising a conveyor path advancing and removing luggage, such as suitcases, parcels and the like cargo items, to and from a second conveyor part connected to and being extend able from said first conveyor part, where said second conveyor part is adapted to be extended into the aircraft through an opening therein and into the cargo compartment of said aircraft, and where said second conveyor part comprises a conveyor path advancing and removing the luggage to or from the storing site inside the cargo compartment.

In connection with the loading and unloading of small aircrafts, such as DC 9, MD 80'ies and Boeing 737 etc., viz. the so-called narrow body aircrafts, it is common knowledge that the work involved is very stressful to the persons involved. The latter is due to the facts that the time available is often very short and that the cargo compartment is of such a small size that the person in question must lie on his knees or sit down inside said cargo compartment while handling the luggage. Accordingly, a relatively high risk of physical damages applies.

Several suggestions have been made to facilitate the work in question. The use of any kind of auxiliary equipment is usually conditioned by said equipment being removed from the aircraft once the loading and unloading operations have been terminated because the weight of said auxiliary equipment has the effect that it cannot be left in the aircraft. In addition, the auxiliary equipment must be movable into and out of the aircraft in a relatively quick manner due to the rather short period available.

WO 98/54073 discloses an apparatus for a manual loading and unloading of aircrafts.

This known apparatus comprises a telescopic conveyor being moved into the cargo compartment and being provided at the end with a table adjustable in height, said table being placed inside the cargo compartment so as to allow a piling of the cargo items therefrom. A conveyor belt is arranged outside the aircraft, said conveyor belt advancing the cargo items to the telescopic conveyor part.

DK-PS No. 170863 discloses a conveyor with a plurality of linked units, where each unit on the upper face comprises a plurality of carrier rollers. These carrier rollers are in turn carried by transverse shafts and are provided with wheels on the bottom side, said wheels allowing the units to roll on a base. A plurality of these linked units is pulled into the cargo compartment of the aircraft from a storing compartment below a belt conveyor arranged outside said aircraft.

BRIEF DESCRIPTION OF THE INVENTION

The object of the invention is to provide an apparatus, which presents a relatively simple structure, and which allows a relatively easy advancing and removal of cargo items into and out of the cargo compartment of an aircraft while ensuring an easy and continuous movement of said cargo items.

This object is achieved by the apparatus described above being characterised in that the second conveyor part comprises a plurality of pivotally interconnected conveyor units with their respective activatable conveyor paths and their respective sets of wheels.

As a result it is relatively easy to handle the extendable second conveyor while simultaneously allowing an easy and continuous movement of the cargo items because the individual conveyor units roll on the floor of the cargo compartment towards and away from the loading site in question inside said cargo compartment and because said conveyor units are adapted to assist in the movement of said cargo items by means of their own driving means.

According to the invention the conveyor paths of the first and the second conveyor part, respectively, may extend end to end, and the pivotally interconnected conveyor units may at least partially form part of the conveyor paths of both conveyor units because they continue directly into one another from the first to the second conveyor part during the extension and the retraction of the second conveyor part. The resulting total conveyor path of the apparatus is relatively uninterrupted and plane.

According to an advantageous embodiment of the invention, the first conveyor part may comprise a continuous conveyor belt, where the conveyor path of said conveyor belt is adjustable in length in response to the extension or retraction of the conveyor units.

Furthermore, the apparatus according to the invention may comprise a bridge member, by means of which the conveyor units of the second conveyor part are transferred between the apparatus and the aircraft. This bridge member ensures an even transition between the apparatus and the aircraft.

According to the invention it is particularly advantageous when the continuous conveyor belt of the first conveyor part extends between a front turning member placeable adjacent the aircraft and a rearmost turning member, where said first conveyor part in addition comprises an intermediate redirecting member reciprocating in the conveying direction and directing the conveyor belt from a rectilinear upper path between the rearmost turning member and the redirecting member to an intermediate path parallel to the upper path, but on a level below said upper path between the redirecting member and the front turning member, whereby the conveyor belt between the front turning member and the rearmost turning member extends below the upper and the intermediate paths, and whereby the upper path forms at least part of the conveyor path of the first conveyor part, and whereby the rear end of the number of conveyor units is connected to the redirecting member of the first conveyor part and accordingly adapted to follow the reciprocating movement thereof, said conveyor units being moved above the intermediate path of the first conveyor part while positioned outside the aircraft. As a result the conveyor paths of the first and the second conveyor part, respectively, can in a simple manner-continue substantially uninterruptedly into one another while it is simultaneously ensured that room is provided for the number of conveyor units or the rearmost portion thereof when all conveyor units or the rearmost portion thereof are not positioned inside the aircraft.

The apparatus may according to the invention advantageously comprise a supporting means supporting the endless conveyor belt of the first conveyor part during its movement within the upper path.

According to the invention it is particularly advantageous when the conveyor paths of both conveyor parts are formed by means of the conveyor units across their entire length. Furthermore, the apparatus may according to the invention comprise a compartment for receiving the rearmost end of the number of conveyor units, said conveyor units in sequence being adapted to be moved out of or into said compartment in response to the distance which the front end must be moved into the aircraft. In this manner it is easy to adapt the number of conveyor units to the length of the cargo compartment of the aircraft in question.

Moreover, the first conveyor part may comprise an endless conveyor belt and be arranged above the path of the conveyor units to an area adjacent the bridge member with the result that it is possible to limit the number of conveyor units and consequently the associated compartment capacity of the apparatus.

The front conveyor unit may according to the invention comprise a conveyor flap pivotally journalled at the back and which can be arranged with a desired inclination relative to the operating plane of the remaining conveyor units by means of driving means. As a result the operator can place the front end of the conveyor flap at a desired level opposite the stack of cargo items being handled at the specific time inside the aircraft.

In this connection the conveyor flap may according to the invention at the front end farthest away from the pivoting location be provided with a conveyor front member also being hingedly journalled, and which can be set with a desired inclination relative to the advancing plane of the conveyor flap by means of its own driving means.

As a result the operator can place the front member in a plane suited for the most advantageous path in and out of a stack of the cargo item in question.

According to the invention each conveyor unit may comprise an endless conveyor belt driven by a driving roller and one or more additional rollers, which are all carried by a frame, said frame in turn being supported by a wheel-carrying support member. The resulting conveyor unit is particularly simple.

The conveyor flap of the front conveyor unit may according to the invention, be formed by the frame and the associated conveyor belt and be pivotally journalled on the wheel-carrying support member, and the driving means thereof may be a plurality of electrically driven actuators. As a result, the front conveyor unit can in a simple manner be moved forwards and backwards inside a cargo compartment although the conveyor flap is arranged with an inclination relative to the floor of said cargo compartment.

Moreover, the conveyor flap may according to the invention project a distance beyond the associated support member when seen in the conveying direction of the second conveyor part during the loading, and according to the invention the conveyor flap may at its front end or the conveyor front member be provided with wheels for supporting said conveyor flap and said conveyor front member when they are in the flapped down position. As a result, an operator can easily find room below the conveyor flap for his legs when said conveyor flap is placed in an inclined position.

However, when the conveyor front member is flapped down the wheels of said conveyor front member ensure that the flap is supported and can be easily handled together with the remaining conveyor units.

It is according to the invention particularly advantageous when the front end of the second conveyor part is provided with a control means connected to all the driving means of the apparatus in such a manner that an operator present inside the aircraft can guide said means by activating said control means. As a result the operator has an efficient control of both conveyor parts.

The conveyor units may according to the invention be interconnected by means of releasable coupling means with the result that the conveyor units are easily replaced and it is possible, if desired, to adjust the number thereof to the prevailing requirements.

Furthermore, the bridge member may according to the invention comprise guiding means for guiding the second conveyor part while it is moved inwards and outwards of the cargo compartment of the aircraft. The resulting movement can be performed in a relatively easy manner.

Moreover, at least some of the coupling means of the conveyor units may according to the invention be such that adjacent conveyor units can be mutually displaced transverse to the conveying direction with the result that they are very easily adjusted to the dimensions of the cargo compartment.

According to the invention it is particularly advantageous when the conveyor front member on the front conveyor unit comprises an endless conveyor belt with its own driving means.

Finally, the apparatus may according to the invention suitably be arranged on a vehicle.

BRIEF DESCRIPTION OF THE DRAWINGS

The invention is explained in greater detail below with reference to the accompanying drawings, in which FIG. 1 is a diagrammatic side view of a first embodiment of the apparatus according to the invention, whereby parts have been removed for the sake of clarity, FIG. 2 is a side view of a first and a second conveyor part of FIG. 1, where the second conveyor part is arranged in the completely extended state, FIG. 3 corresponds to FIG. 1, but where the second conveyor part is arranged in the partly extended state, FIG. 4 corresponds to FIG. 2, but where the second conveyor part is completely retracted relative to the first conveyor part, FIG. 5 is a top view of the embodiment of FIG. 4, FIG. 15 is a diagrammatic, perspective view of a conveyor unit forming part of the second conveyor part, whereby parts have been shown separately for the sake of clarity, FIGS. 16 and 17 are diagrammatic views of the front end of the second conveyor part during the loading and the unloading, respectively.

DESCRIPTION OF THE PREFERRED EMBODIMENTS

Figure 7:
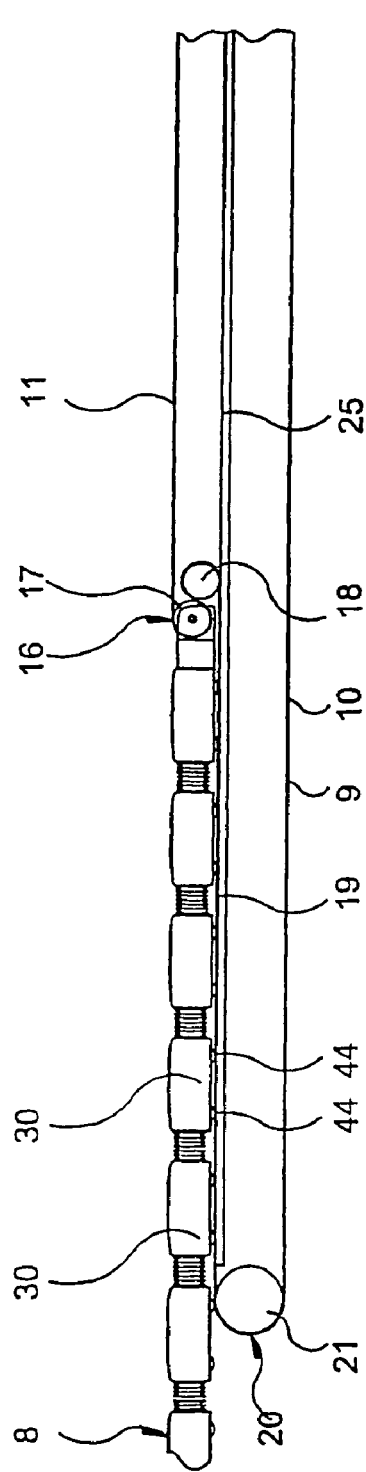
FIG. 7 is a side view of the embodiment of FIG. 6, FIGS. 8 to 11 are diagrammatic top views of various steps of the apparatus during the moving of the second conveyor part into the cargo compartment of an aircraft.

The apparatus of FIG. 1 comprises a vehicle designated the general reference numeral 1 and provided with a cab 2 and a platform 3. The cab 2 is of a width corresponding to approximately half the width of the platform 3. Next to the cab 2, the vehicle 1 is provided with a ramp 4 tiltably arranged in a manner not described in greater detail. This ramp 4 can be positioned with a suitable inclination relative to the platform 3 of the vehicle 1 by means of an actuator 5. The ramp 4 extends substantially across the entire length of the vehicle 1, the front end 6 of said ramp being positioned in the area around the front side of the cab 2.

The ramp 4 carries a first conveyor part designated the general reference numeral 7, and a second conveyor part designated the general reference numeral 8. The first conveyor part 7 comprises an endless conveyor belt 9 shown in detail in FIGS. 1 to 4 where parts of the four sides of the ramp have been removed for the sake of clarity. At the rear end of the ramp 4, this endless conveyor belt 9 runs from a lower path 10 to an upper path 11 or vice versa through a rear turning member 12 which is provided with a plurality of rollers 13, 14 and 15. At its front end, the upper path 11 ends at a redirecting member designated the general reference numeral 16, cf. also FIGS. 6 and 7. The redirecting member 16 comprises two interconnected rollers 17 and 18 redirecting the conveyor belt 9 to an intermediate path 19 continuing forwards towards the front end 6 of the ramp parallel to the upper path 11, but on a level there below. This intermediate path 19 ends at a front turning member designated the general reference numeral 20 and comprising a single roller 21. The conveyor belt 9 returns to the lower path 10 through the latter single roller 21, said lower path 10 extending parallel to the upper path 11 and the intermediate path 19.

Figure 6:
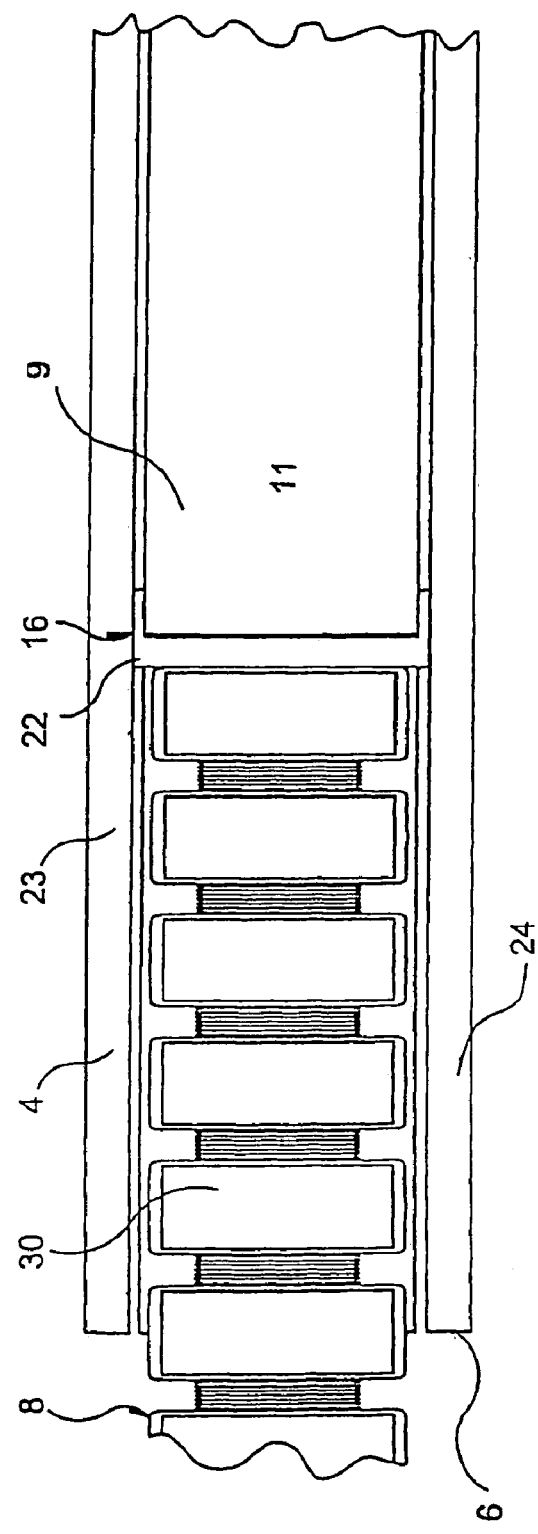
FIG. 6 is a top view on a larger scale of the embodiment of FIG. 5, but where parts have been removed for the sake of clarity.

As shown in particular in FIGS. 6 and 7, the redirecting member 16 is by means of a U-shaped bracket 22 connected to the rear end of the second conveyor part 8 when seen in the longitudinal direction of the vehicle 1. As the bracket 22 simultaneously engages suitable guides not shown in greater detail along the sides 23 and 24 of the ramp 4, cf. FIG. 6, the reciprocating movement of the second conveyor part 8 relative to the longitudinal direction of the vehicle 1 implies that the redirecting member 16 follows said movement in such a manner that the upper conveyor path 11 of the first conveyor part 7 is of an increasing or decreasing length in response to the position of the rear end of the second conveyor part 8. Within the intermediate path 19, the conveyor belt 9 is supported by a supporting plate 25, cf. FIG. 7, through suitable means (not shown) for reducing the friction.

Within the upper path 11, the conveyor belt 9 is supported by a supporting means 26 comprising a high number of interconnected lamellas 27, said lamellas being hingedly interconnected along the longitudinal side farthest away from the conveyor belt 9.

At one end, this supporting means 26 is connected to the redirecting member 16 in such a manner that it follows the movement of said redirecting member 16. In addition, the supporting means is adapted to move from a position immediately adjacent the lower path 10 to a position below the upper path 11 through the rear end adjacent the turning member 12 of said supporting plate 25 in such a manner that the number of lamellas in the supporting state below the upper path 11 corresponds substantially to the entire length of the upper path 11. If necessary, the movement from one side to the opposite side of the supporting plate can be facilitated by means of guides not shown in greater detail. In addition, the end of the supporting means 26 farthest away from the redirecting member 16 can also be connected to said redirecting member through conventionally known means in such a manner that the end in question is subjected to a tractive force when the redirecting member 16 is moved downwards towards the rearmost turning member 12. The second conveyor part 8 comprises a plurality of conveyor units 30, which all are substantially identical apart from the front conveyor unit 31. All the conveyor units 30 comprise a continuous belt 32, cf. FIG. 15, driven around suitable rollers 33, 34 and 35. These rollers are journalled in a frame 36 arranged on a support member 37.

The support member 37 is arranged on rollers 44. The conveyor units 30, 31 are interconnected by means of flexible coupling means which allow said conveyor units to be mutually turned both in the horizontal and in the vertical direction and be mutually displaced a short distance in the same directions. The coupling means are surrounded by bellow-shaped tubes of rectangular cross sections and with circumferential waves. The frames 36 and the support members 37 are made of a suitable plastic material. The coupling means are furthermore adapted in a manner not described in greater detail to releasably couple the conveyor units 30, 31 together in such a manner that said conveyor units are easily replaceable. In addition, the bellow-shaped tube surrounding the coupling means provides an easy access to passage of a main distributing system with associated coupling equipment with the result that the individual conveyor units 30, 31 can be supplied with the desired energy, such as electric current in an easy manner. As mentioned above, the rearmost conveyor unit 30 is connected to the redirecting member 16 of the first conveyor part. The conveyor units are further provided with such a height that the conveying plane thereof, i. e. the upper side of the conveyor belts 32, is flush with the upper path 11 of the endless conveyor belt 9, cf. FIG. 7.

Figure 13:
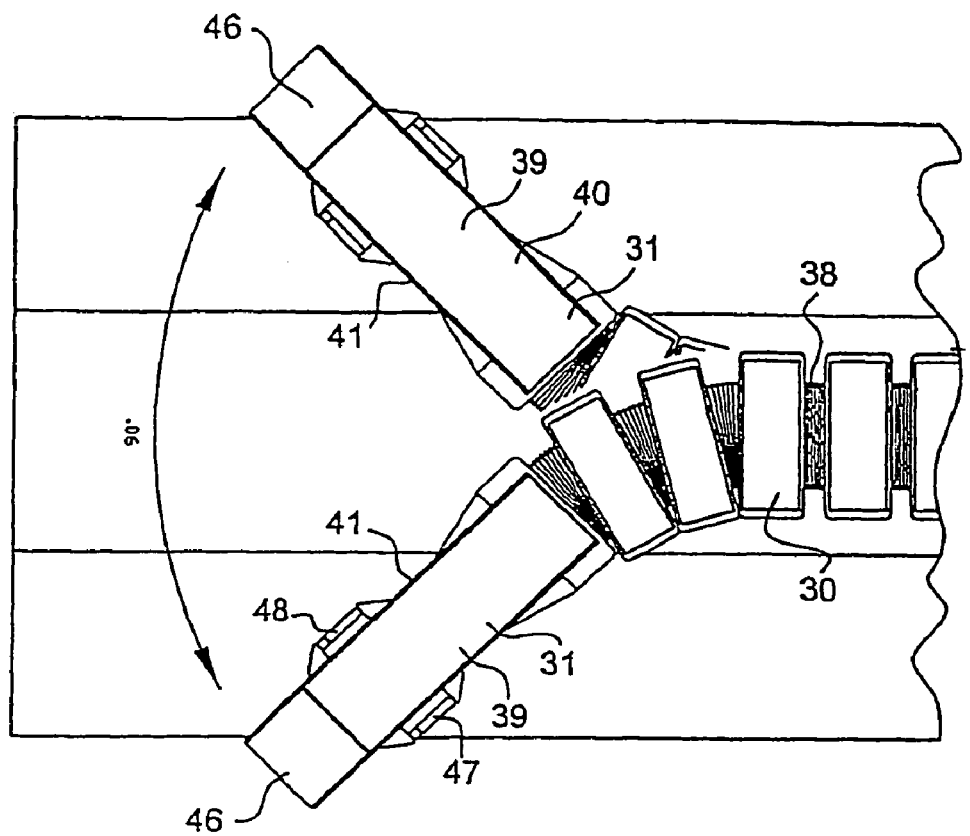
FIGS. 13 and 14 are a top and a side view, respectively, of the various steps of the front end of the second conveyor part.
Figure 14:
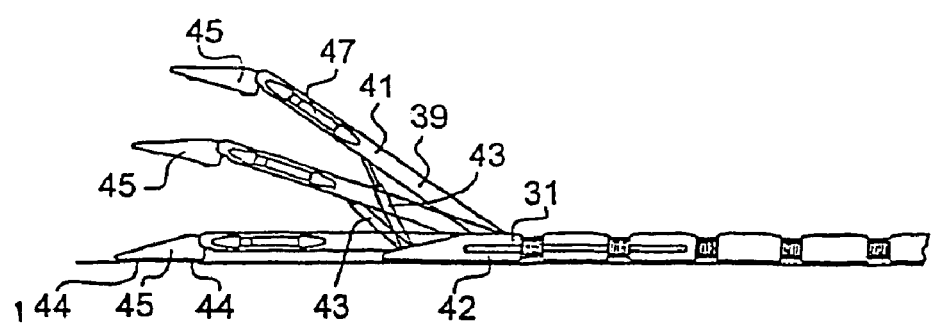

The front conveyor unit 31 comprises a rearwardly journalled conveyor flap 39, cf. in particular FIGS. 13 and 14. In FIG. 13, the conveyor flap 39 is shown in two possible positions and in FIG. 14 three possible positions are shown. This conveyor flap 39 comprises an endless conveyor belt 40 received in a manner not described in greater detail in a frame 41. At the back, the frame 41 is pivotally journalled in a manner not described in greater detail in a support member 42 also arranged on wheels 44, cf. FIG. 1. Jacks 43 are arranged between the frame 41 and the support member 42, said jacks allowing an adjustment of the conveyor flap 39 in a position with a desired inclination.

At the front, the conveyor flap 39 is provided with a pivotally journalled conveyor front member 45. When seen from the side, this conveyor front member 45 is of a triangular cross section and also associated with an endless conveyor belt 46. This conveyor front member 45 can be set with a desired inclination relative to the conveyor flap 39 by means of members not shown in greater detail. The upper side of the conveyor belt 46 of the conveyor front member 45 is mainly positioned in a horizontal plane when the conveyor flap 39 is arranged with a predetermined inclination relative to the conveying direction of the remaining conveyor units.

The conveyor front member 45 may also include wheels 44' associated with said conveyor front member 45 to support the projecting conveyor flap 39 together with the support member 42.

Handles 47 and 48 are accommodated on the side of the frame 41 of the conveyor flap 39. These handles 47 and 48 allow an operator to manoeuvre the second conveyor part 8. These handles 47 and 48 are in addition adapted to be used as control means such a manner that by a suitable turning of said handles the operator can activate or actuate the various driving means not shown of the first and the second conveyor parts 7, 8.

An extendable bridge member 50 is mounted in connection with the front end of the ramp, cf. FIGS. 8 to 12 and 20. This bridge member 50 is tiltable, cf. FIG. 20, and adapted to be arranged in a substantially horizontal position by means of an actuator 28 so as to be moved through an opening 51 into a cargo compartment 52 of an aircraft 53. In FIGS. 8 to 12, the door usually closing the opening to a cargo compartment 52 has been removed. Then the bridge member forms a bridge between the ramp 4 and the floor 54 of the cargo compartment 52 directly inside the opening 51.

Figures 8, 9:
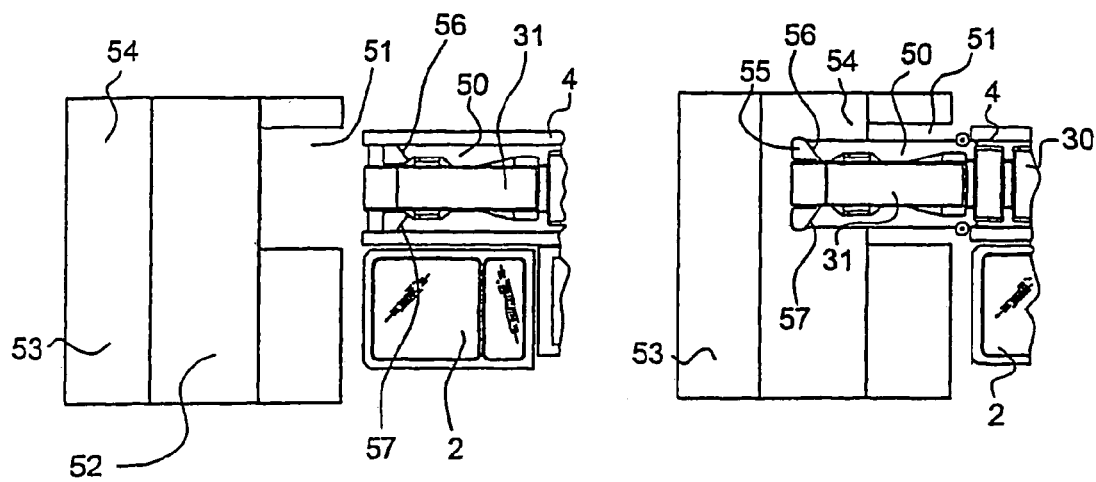

As illustrated in FIG. 8, the bridge member 50 is positioned directly below the front conveyor unit 31 when said conveyor unit is in the retracted state on the ramp. As illustrated in FIG. 9, the bridge member is moved forwards and through the opening 51 together with the front conveyor unit 31. This inward movement is carried out at the same time as the inclination of the ramp 4 is adjusted so as to place the bridge member 50 at about the same level as, and on the floor 54 of the cargo compartment 52. When the bridge member has been positioned so as to rest on the floor 54 inside the cargo compartment 52, the front conveyor unit is lifted outwards to one side or the opposite side of said bridge member 50 in such a manner that from this position it can be pulled backwards or pushed forwards inside said cargo compartment together with the subsequent conveyor units 30. Such a control or guiding of the front conveyor unit 31 and the succeeding conveyor units 30 is enhanced by a raised platform 55 with suitably shaped guiding sides 56 and 57, said conveyor units 30 and 31 sliding against said guiding sides during their movement.

Suitable means not shown couple and uncouple the bridge member to and from the front conveyor unit 31 in such a manner that together with said conveyor unit 31 the bridge member can be moved into and out of the opening 51 of the cargo compartment 52.

Figures 10, 11:
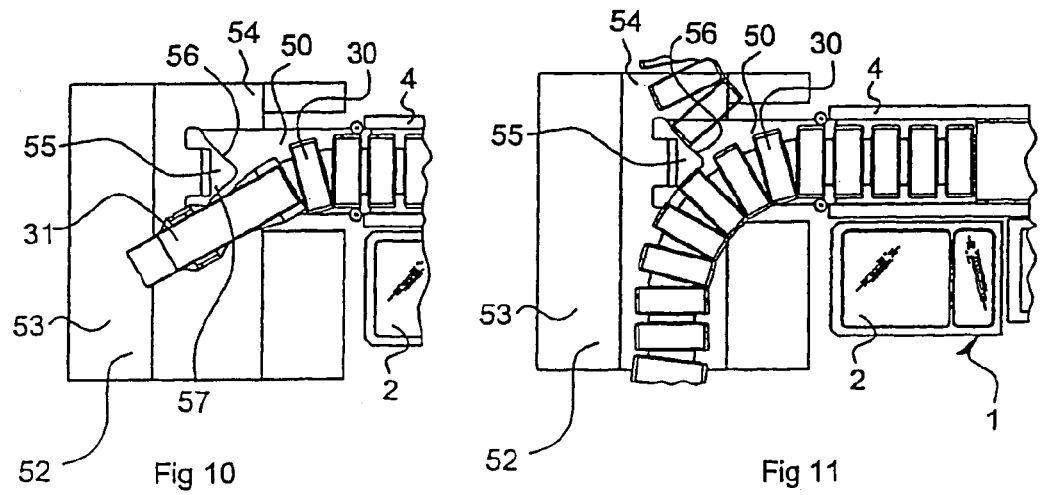
Figure 12:
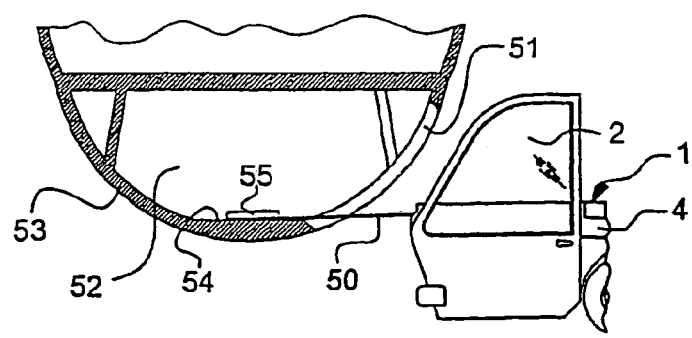
FIG. 12 is a diagrammatic view of the apparatus with a bridge member extending through the opening into the cargo compartment of an aircraft, but where the conveyor parts have been removed for the sake of clarity.

During the use of the apparatus according to the invention, the second conveyor part is pushed and moved into the cargo compartment in question, cf. FIGS. 10 and 11, where an operator can use said second conveyor part for the loading and unloading, respectively, cf. FIGS. 16 and 17. As illustrated in FIG. 16, the operator can let the luggage 59 be pulled upwards over his legs by means of the conveyor flap 39 and subsequently by means of the conveyor front member 45 directly on top of a stack 60 of cargo items. During the unloading, the cargo items are pulled out of the stack 60 and placed on the front conveyor unit 31 and subsequently moved further out of the cargo compartment. During the use of the apparatus, the operator can, of course, position and use the conveyor flap 39 as he wishes. All the movements and stops as well as the adjustment of the length of the second conveyor part 8 inside the cargo compartment in question can by means of the handles 47 be controlled by the operator according to the prevailing circumstances inside said cargo compartment.

Figure 18:
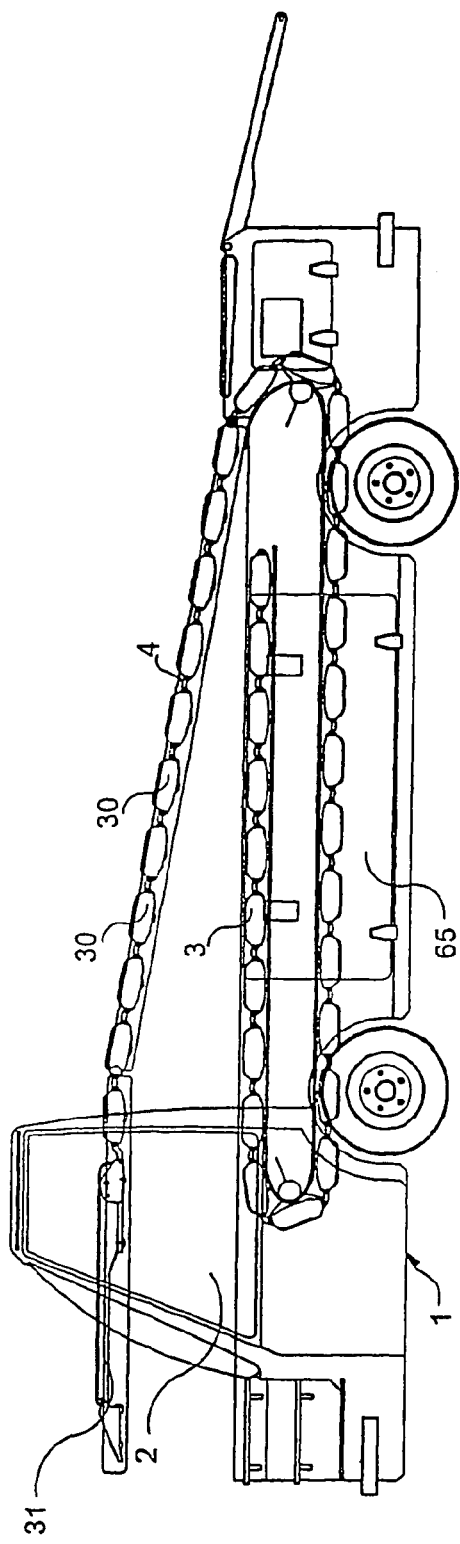
FIGS. 18 and 19 are diagrammatic views of a second embodiment of the apparatus according to the invention, where both the first and the second conveyor part are formed by a coherent row of conveyor units shown in the extended and the retracted state, respectively.
Figure 19:
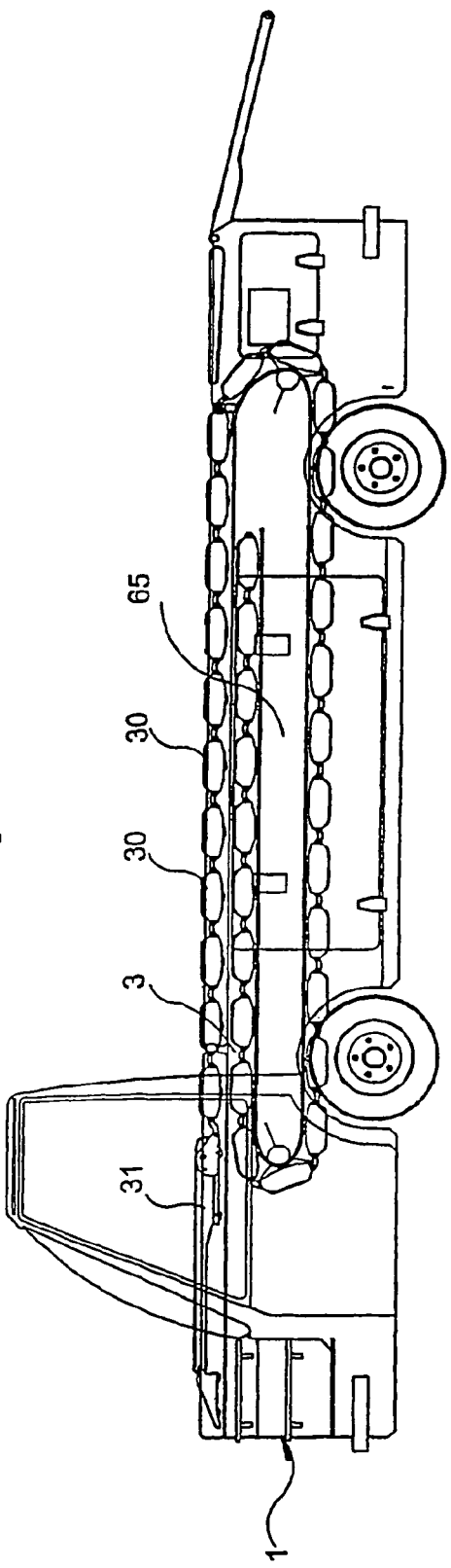
Figure 20:
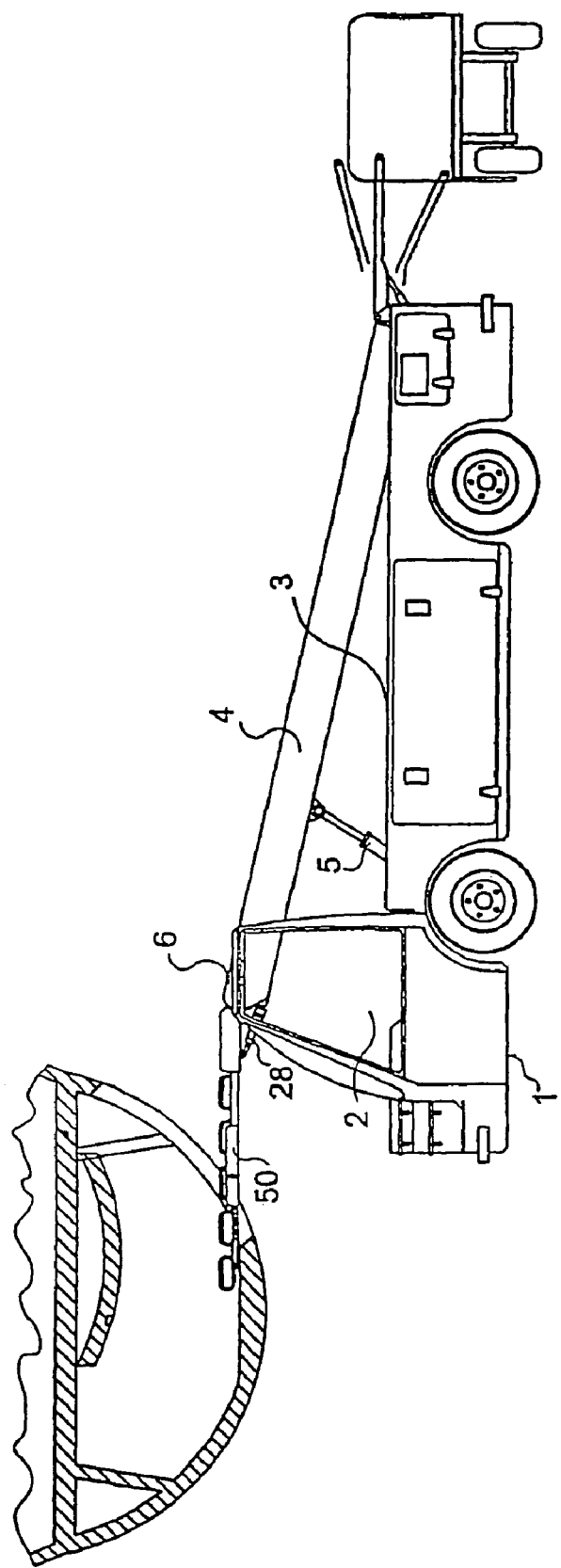
FIG. 20 illustrates an apparatus according to the invention with a tiltable bridge member.
Figure 24:
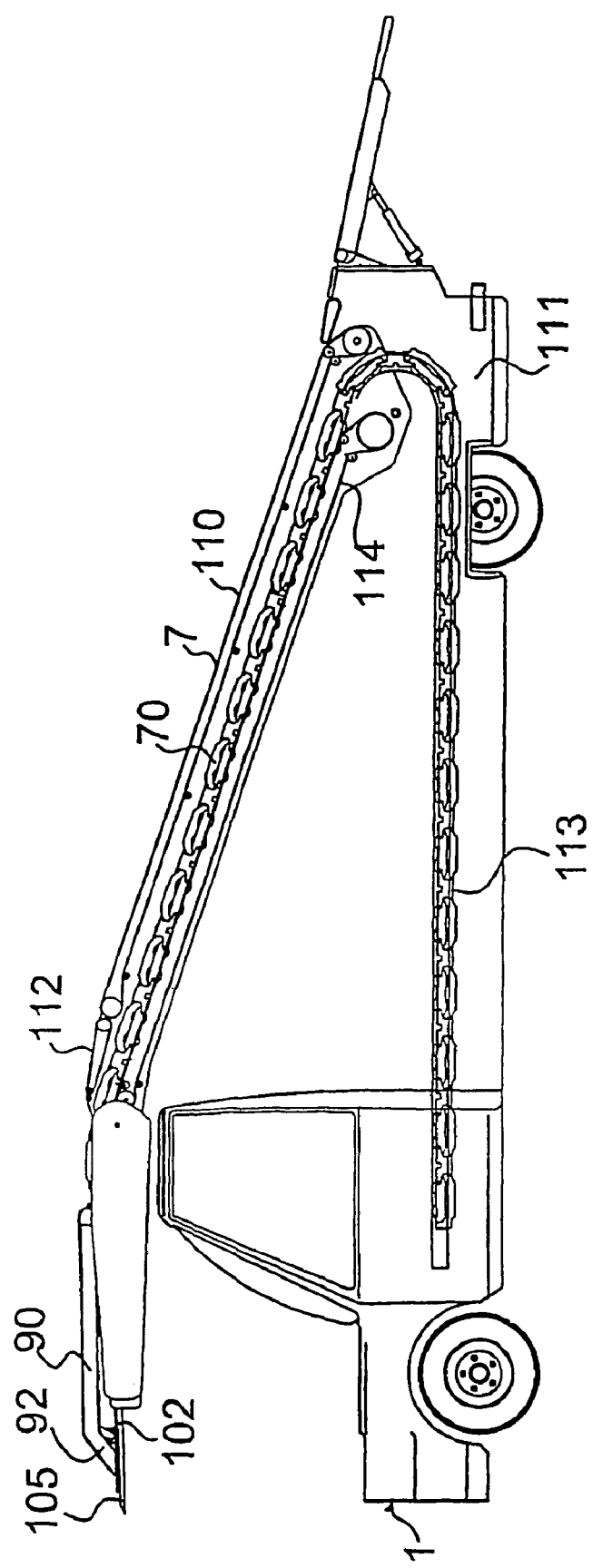
FIG. 24 illustrates a third embodiment of the apparatus according to the invention, where the first conveyor part is formed by an endless conveyor belt arranged above the row of conveyor units of the first conveyor part within the path of said conveyor units from a storing compartment to the bridge member.

FIGS. 18 and 19 illustrate a second embodiment of the apparatus according to the invention. Here the conveyor paths of both the first and the second conveyor parts 7 and 8 are formed by a coherent row of conveyor units 30 and front conveyor 31. The rear end of this row of conveyor units is received in a compartment 65 below the platform 3 of the vehicle 1, and from this position it is moved through the rear end of the vehicle upwards onto the ramp as the front end of the row is moved into the cargo compartment 52 of the aircraft 53. This embodiment is particularly suited for use in connection with particularly long cargo compartments 52 requiring a relatively high number of conveyor units. In the second embodiment, the length of the row of conveyor units 30 is such that it may be stored in a folded configuration wherein at least one portion of said conveyor is positioned over at least one other portion of said conveyor when the succession of conveyor units is in a retracted position. An exemplary folded configuration is depicted in FIGS. 18, 19, and 24 where the connected succession of conveyor units are configured, when in the retracted position, such that the total length of the connected succession of conveyor units is significantly longer that the apparatus that stores it.

The individual members, and especially the conveyor units of the second conveyor part 8 are made mainly of plastic materials in response to the desired strength. Furthermore, additional conveyors 61 and 62 can be mounted at the rear end of the apparatus so as to facilitate the transition between the equipment for the advancing and removal of luggage and the rear end of the first conveyor part 7. All driving means are connected to power sources in the vehicle 1 in a manner not described in greater detail.

Figure 21:
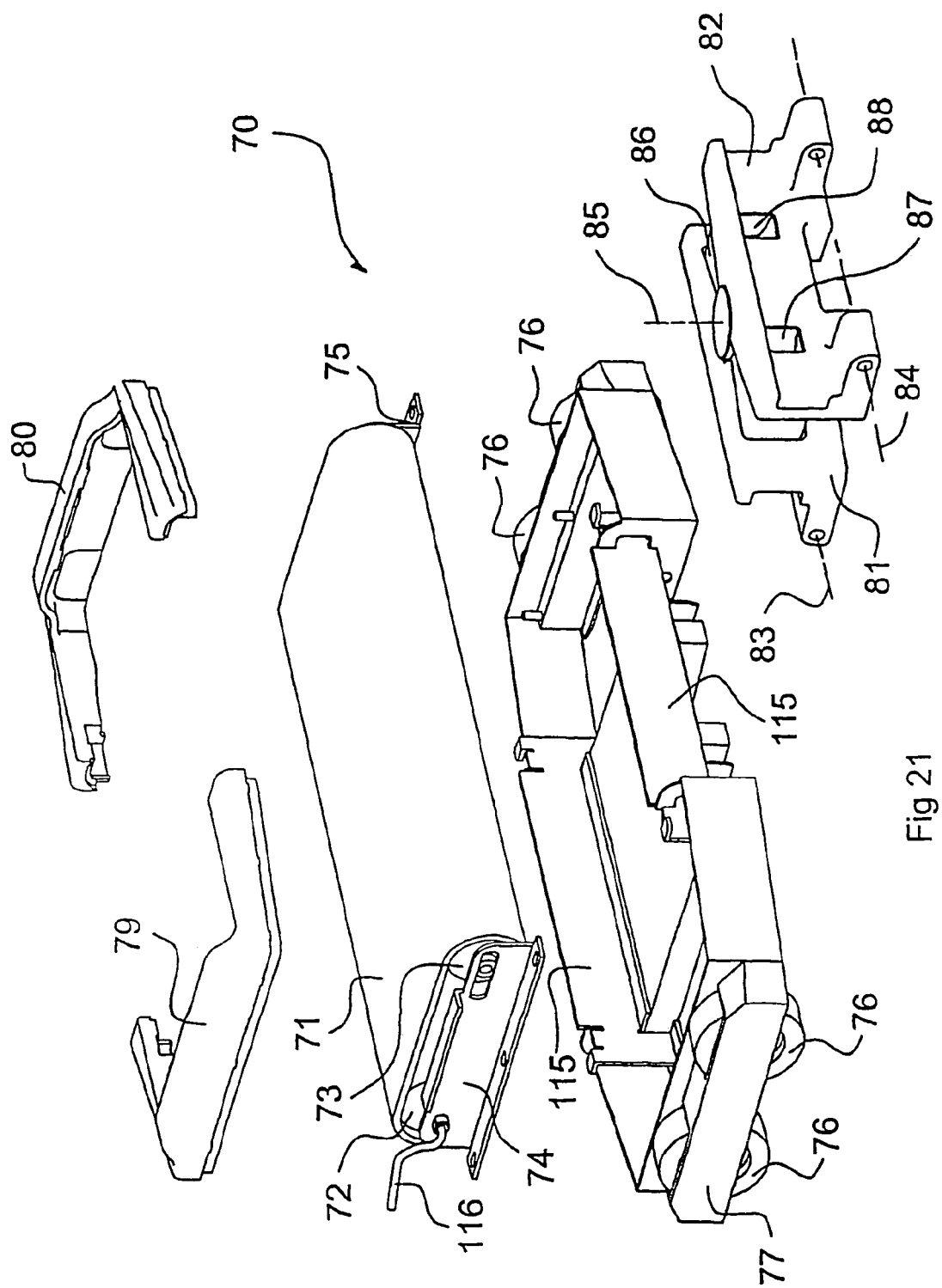
FIG. 21 is a perspective view of a second embodiment of a conveyor unit forming part of the second conveyor part, where the individual parts have been separated for the sake of clarity.

FIG. 21 illustrates a second embodiment of a conveyor unit with a continuous belt 71 supported by rollers 72 and 73, where the first roller 72 is a driving roller supplied with electric energy as indicated through a conduit 116. The rollers 72 and 73 are journalled in a frame 75 by means of brackets 74 and 75. The frame 75 is at both sides provided with a pair of wheels 76 which are protected by means of screens 77 and 78, respectively, in such a manner that they are uncovered both at the top and at the bottom whereby the conveyor units can roll on suitable guides both in a position in which the conveyor belt 71 faces upwards and in a position in which said conveyor belt faces downwards, cf. FIG. 24. Screens 79 and 80 are mounted on the frame 75 along the sides of the conveyor belt 71.

The conveyor units are joined by means of coupling members 81 and 82 preferably made of die-cast aluminium. These coupling members 81 and 82 are pivotally journalled about axes 83 and 84 in two abutting conveyor units and mutually pivotally journalled about an axis 85, a rubber unit 86 being placed between said coupling members. This rubber unit 86 ensures both a straightening of the conveyor units when said conveyor units are not subjected to a mutually turning load, and provides a protected passage of electric conduits between the conveyor units through suitable channels 87 and 88. The conveyor units carry members 115 co-operating with the coupling members 81 and 82 in such a manner that they can only turn in one direction about the axes 83 and 84 away from a common plane through the conveyor units parallel to their conveyor paths.

Figure 22:
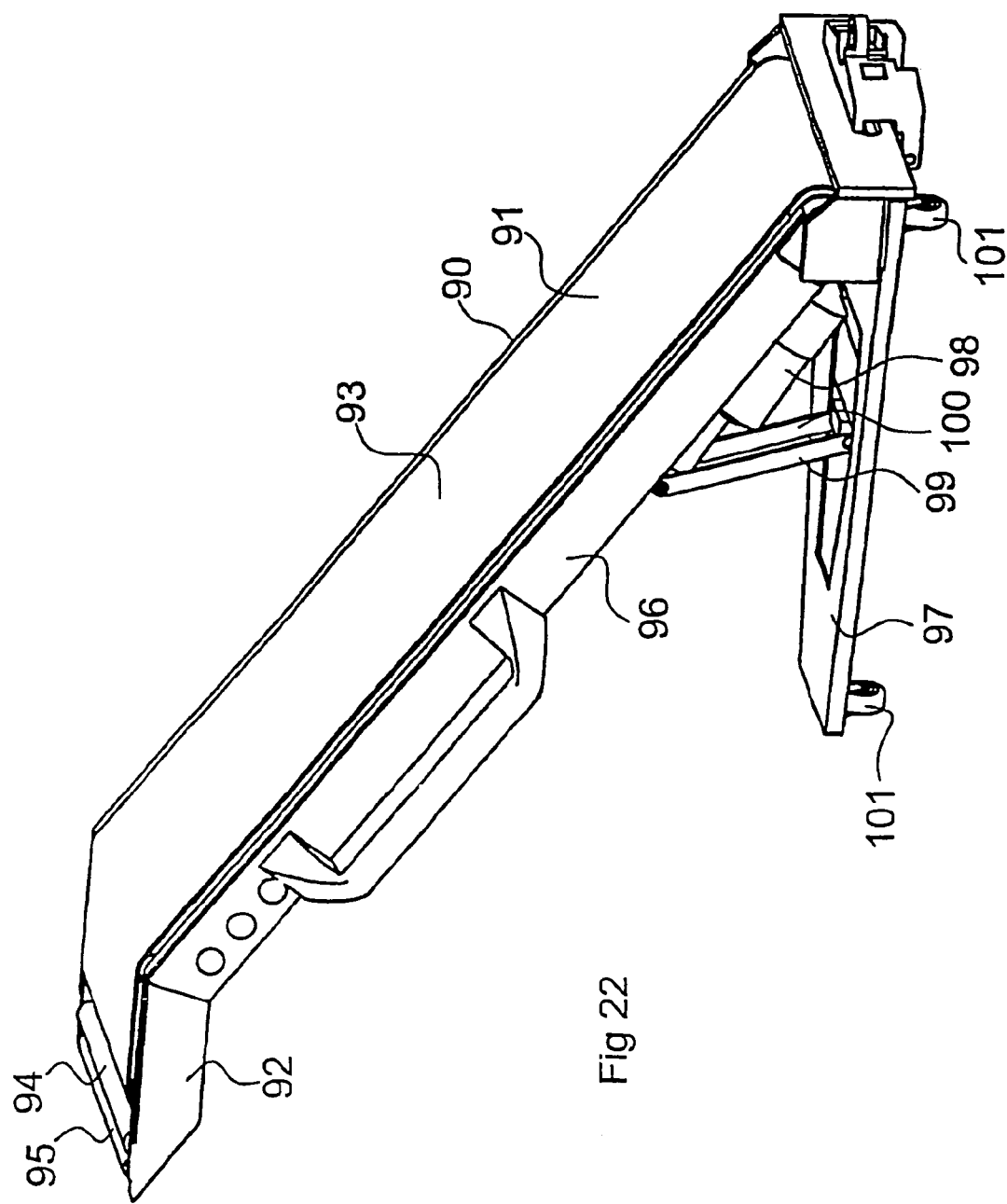
FIG. 22 is a perspective view of a second embodiment of the front conveyor unit of the second conveyor part.

FIG. 22 illustrates a second embodiment of the front conveyor unit. This conveyor unit is designated the general reference numeral 90 and comprises a conveyor segment 91. At the front, the conveyor segment 91 forms a bend in such a manner that the front conveyor unit comprises a front member 92 permanently connected to the remaining portion of the segment 91. The front conveyor unit 90 comprises an endless conveyor belt 93 extending over the front member through suitable rollers. In front of the continuous belt 93, a pair of loosely journalled rollers 94 and 95 are provided. The conveyor segment 91 comprises a frame 96 which at the back is pivotally journalled in a support member 97. This support member 97 carries jacks 98 and supporting means 99 and 100 which are hingedly mounted on the support member 97 and displaceably mounted on the frame 96. The support member 97 comprises wheels 101 rotatably arranged about shafts which extend perpendicular to the plane of the support member 97. In addition, one or more wheels 102, cf. FIG. 24, are provided below the front member 92 of the flap 91, said wheels being of the same type as the wheels 101.

Figure 23:
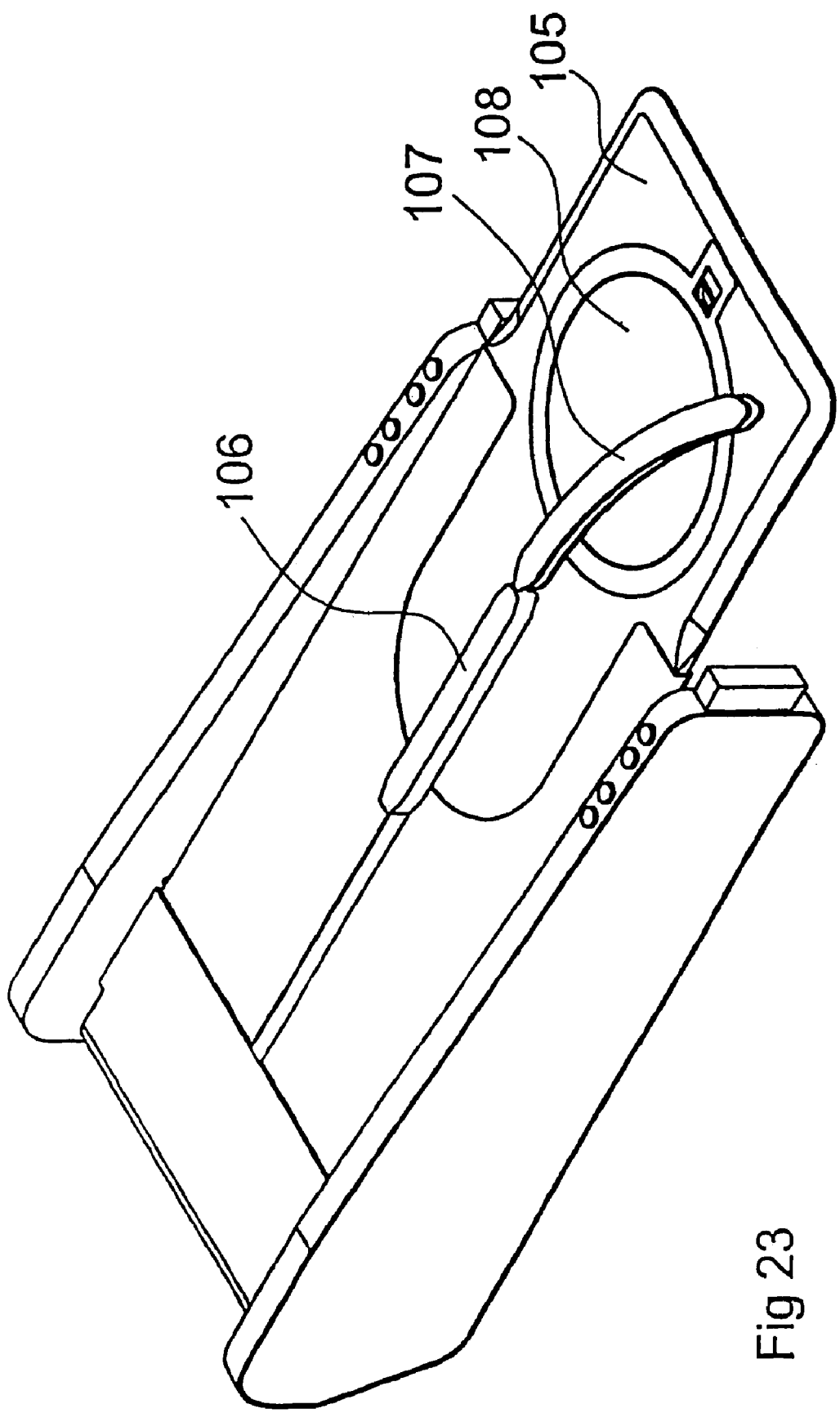
FIG. 23 is a perspective view of a second embodiment of a bridge member.

FIG. 23 illustrates a telescoping bridge member 105 comprising guide means 106 and 107. These guide means 106 and 107 allow a guiding of the row of conveyor units in the desired direction into the cargo compartment of an aircraft. The front guide means 107 of the two guide means is arranged on a rotatable disc 108 which allows a setting of said guide means 107 in the desired direction. The guide means 106 and 107 are adapted to co-operate with suitable guide members not shown on the bottom side of the conveyor units.

FIG. 24 illustrates a third embodiment of the invention. Here the conveyor path of the first conveyor part 7 is formed by a first endless conveyor belt 110 mounted above the path of the conveyor units 70 between a compartment 111 and the bridge member 105. The first conveyor part 7 comprises furthermore a front conveying means with a second continuous belt 112, and which in front tapers in such a manner that the cargo items being handled pass in a relatively easy manner to and from the endless conveyor belt of the first conveyor part 7. As indicated in FIG. 24, rails 113 are provided in the compartment 111, and the conveyor units 70 can run on said rails by means of the wheels 76 while the endless conveyor belts face downwards. In the third embodiment, the length of the row of conveyor units 70 is greater than the length of the conveyor units above it. As here embodied, the length of the row of conveyor units 70 exceeds the length of the upper conveyor units 112 and 7 such that at least a portion of the row of conveyor units 70 are located below the portion of the row of conveyor units lying just beneath and adjacent the upper conveyors when the row of conveyor units are in the fully retracted position. In FIG. 24, a major portion of the row of conveyor units 70 are beneath the row of conveyor units 70 just below the first conveyor part 7. In such a manner, the length of the row of conveyor units 70 can be stored in a folded configuration and significantly exceed the length of the upper conveyor 7.

The moving of the conveyor units 70 to and from the compartment is carried out by means of a driving, endless conveyor belt 114 which co-operates with the bottom side of the conveyor units 70 in a suitable manner, such as by way of friction.

The invention has been described with reference to preferred embodiments. Many modifications can be carried out without thereby deviating from the scope of the invention. The first and the second conveyor parts 7 and 8 and the associated ramp 4 can for instance be mounted on another equipment than the vehicle. In this connection the vital factor is that an adjustment can be performed to the positioning of the opening into the cargo compartment in question.

The invention has been described for use in connection with an aircraft but can, of course, also be used in other situations where similar circumstances apply.

Instead of lamellas 27, the supporting means 26 can also be provided with rollers, and the conveyor units 30, 31 can be adapted to slide in suitable guides on the sides of the ramp 4 instead of resting on their own wheels as long as they are positioned on said ramp 4.

The invention claimed is:

1. A ground vehicle for loading and unloading an aircraft having a cargo compartment, said vehicle comprising:
   a chassis supported by wheels,
   a tiltable ramp pivotally connected to said chassis, and
   a segmented conveyor comprising a connected succession of conveyor units interconnectable by coupling members that allow pivotal movement between each of said conveyor units,
   said chassis having a compartment for receiving a portion of said conveyor,
   said segmented conveyor having a first end disposed to be placed adjacent said aircraft and a second end,
   said segmented conveyor having a first end conveyor unit arranged at said first end of said segmented conveyor,
   said segmented conveyor being at least partially supported by said tiltable ramp, and
   said segmented conveyor being at least partially extendable from said vehicle into said cargo compartment,
   said vehicle being constructed for storing said conveyor in a folded configuration wherein at least one portion of said conveyor is positioned over at least one other portion of said conveyor when the succession of conveyor units is in a retracted position.

2. The vehicle of claim 1, wherein said first end conveyor unit comprises at least one cargo lifting device having a variable inclination.

3. The vehicle of claim 2, wherein said vehicle further comprises a pivoting element coupled with said at least one cargo lifting device, said pivoting element configured to allow an operator to cause a horizontal pivoting movement of said at last one cargo lifting device.

4. The vehicle of claim 2, wherein said vehicle further comprises at least one cargo lifting device control system whereby an operator present inside the aircraft can control the inclination of said at least one cargo lifting device.

5. The vehicle of claim 1, wherein said vehicle comprises a second conveyor above said segmented conveyor, said second conveyor having a first end disposed to be proximal to said aircraft and a second end opposite thereto.

6. The vehicle of claim 5, wherein said second conveyor comprises an endless conveyor belt.

7. The vehicle of claim 6, wherein said first end of said second conveyor is approximately coplanar with said second end of said segmented conveyor.

8. The vehicle of claim 5, wherein said second conveyor is height-adjustable or tiltable or both height-adjustable and tiltable.

9. The vehicle of claim 5, wherein said vehicle further comprises a bridge member having a first end affixed at said first end of said second conveyor, said bridge member utilized to support said segmented conveyor between said second conveyor and said cargo compartment.

10. The vehicle of claim 9, said bridge member being pivotally affixed at said first end of said second conveyor such that said bridge member can be configured to be approximately horizontal.

11. The vehicle of claim 5, wherein said vehicle further comprises a second cargo lifting device at said second end of said second conveyor, said second cargo lifting device having variable inclination.

12. The vehicle of claim 11, wherein said vehicle further comprises a second cargo lifting device control system whereby an operator outside the aircraft can control the inclination of said second cargo lifting device.

13. The vehicle of claim 12, wherein said vehicle further comprises a second pivoting element coupled with said second cargo lifting device, said second pivoting element configured to allow an operator to cause a horizontal pivoting movement of said second cargo lifting device.

14. The vehicle of claim 5, wherein a portion of said segmented conveyor beneath said second conveyor is generally parallel and adjacent thereto.

15. The vehicle of claim 14, wherein the portion of said connected succession of conveyor units not beneath said second conveyor and generally parallel and adjacent thereto are stored in a folded configuration wherein at least one portion of said conveyor is positioned over at least one other portion of said conveyor when the succession of conveyor units is in a retracted position.

16. The vehicle of claim 1, wherein each conveyor unit comprises a driven endless conveyor belt.

17. The vehicle of claim 16, wherein each endless conveyor belt is driven by a driving roller, and said each conveyor unit further comprises at least one roller supported by a frame which in turn is supported by a support member having wheels.

18. The vehicle of claim 16, wherein the width of said conveyor belt is greater than the distance between said rollers.

19. The vehicle of claim 16, wherein said coupling members comprise releasable couplings.

20. The vehicle of claim 16, wherein said conveyor units comprise a mechanism for extending said segmented conveyor from said vehicle.

21. The vehicle of claim 16, wherein said coupling members further comprise pivots between adjacent conveyor units, said pivots allowing at least limited vertical pivotal movement of a conveyor unit with respect to an adjacent conveyor unit.

22. The vehicle of claim 21, said pivots being adjacent the outer periphery of said conveyor units.

23. The vehicle of claim 1, wherein said vehicle further comprises a control system whereby an operator present inside the aircraft can control said segmented conveyor.

24. The vehicle of claim 1, said vehicle being constructed for storing said conveyor in a folded configuration wherein at least one portion of said conveyor is positioned over at least two other portions of said conveyor when the succession of conveyor units is in a retracted position.

* * * * *

UNITED STATES PATENT AND TRADEMARK OFFICE
CERTIFICATE OF CORRECTION

PATENT NO. : 7,156,604 B2 Page 1 of 1
APPLICATION NO. : 10/720471
DATED : January 2, 2007
INVENTOR(S) : Lars Thøgersen It is certified that error appears in the above-identified patent and that said Letters Patent is hereby corrected as shown below:

In Claim 3, Column 10, Line 54, "at last one" should read --at least one--.

Signed and Sealed this

Twenty-eighth Day of August, 2007

JON W. DUDAS
*Director of the United States Patent and Trademark Office*